Nov. 3, 1959 F. MÜLLER ET AL 2,910,775
MEASURING APPARATUS
Filed July 28, 1953 3 Sheets-Sheet 3
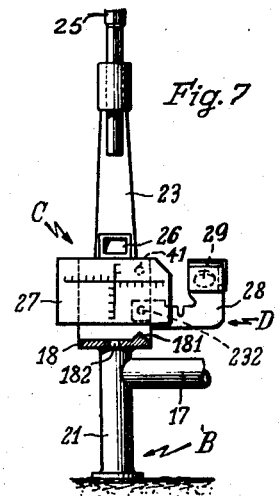
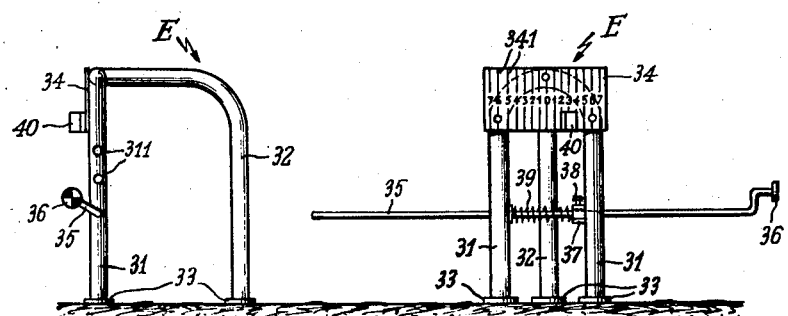
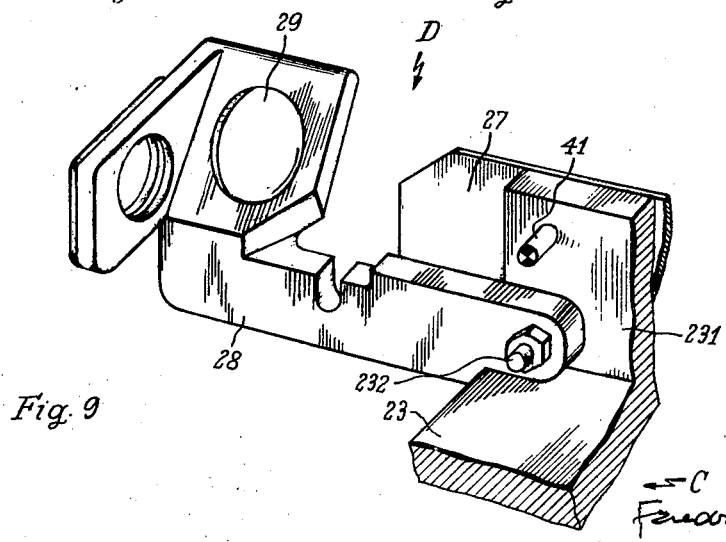
Inventor:
Frederic Müller

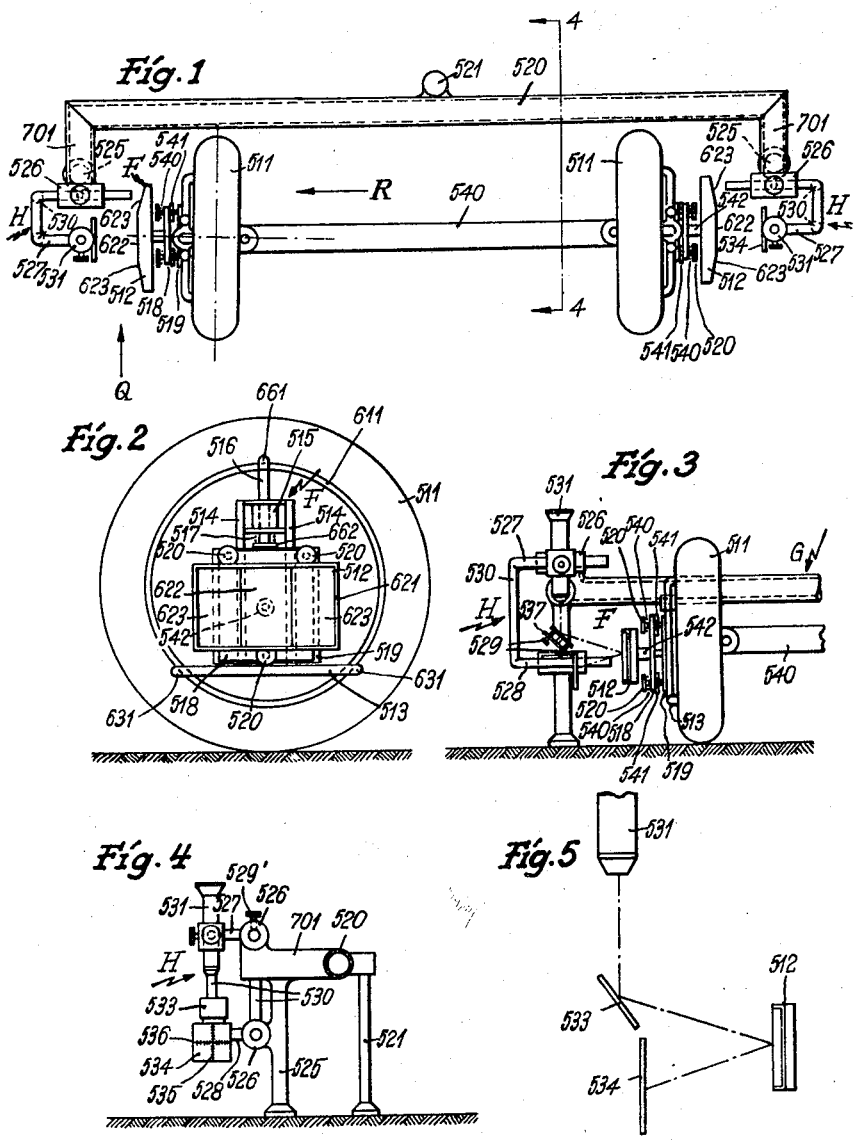

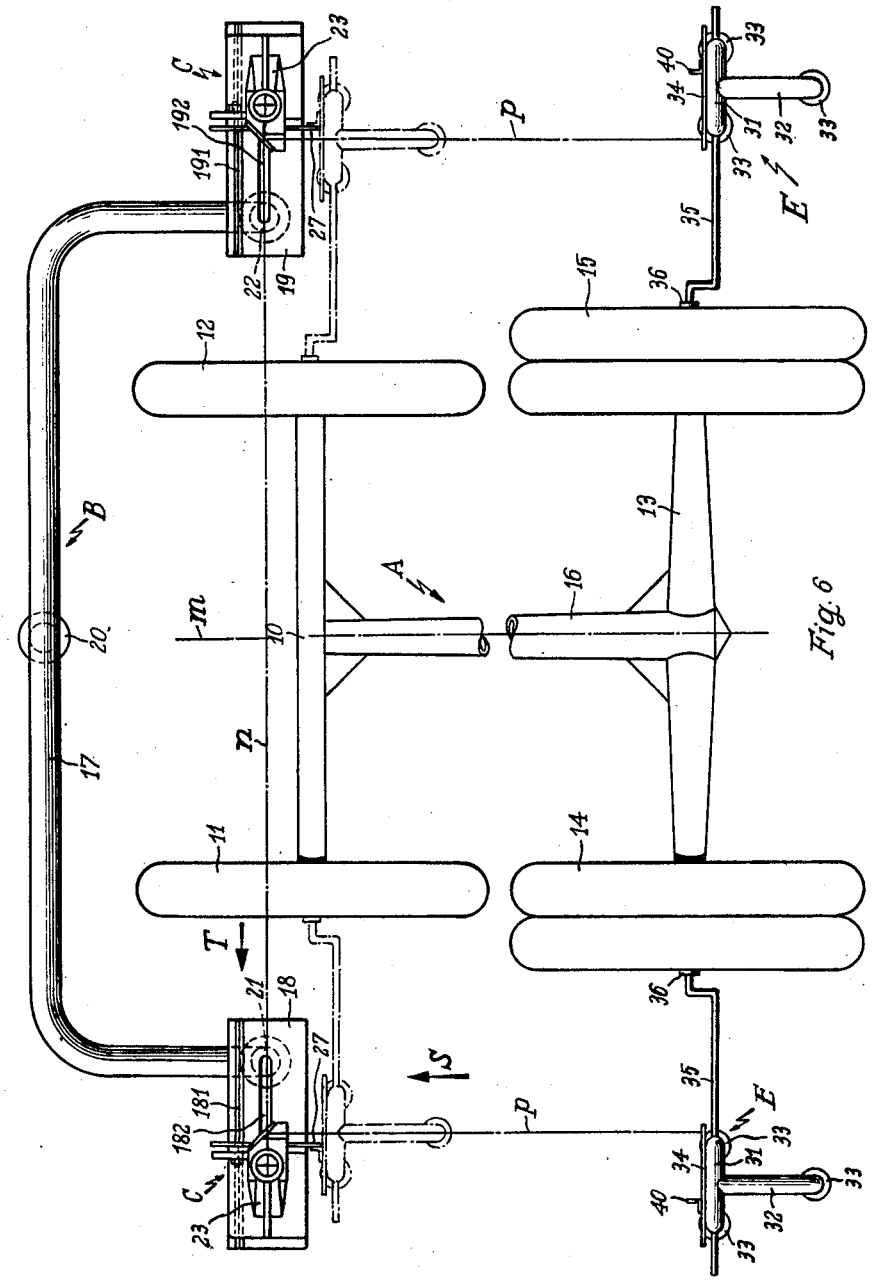

United States Patent Office 2,910,775
Patented Nov. 3, 1959

2,910,775

MEASURING APPARATUS

Friedrich Müller, Heilbronn (Neckar), and Heinrich Goldbrunner, Affaltrach Kreis Heilbronn (Neckar), Germany Application July 28, 1953, Serial No. 370,784

Claims priority, application Germany July 28, 1952

14 Claims. (Cl. 33—46)

The invention relates to a measuring apparatus for measuring the alignment relations of wheels of vehicles.

It is an object of the present invention to provide an improved and particularly simple apparatus for measuring such features as the camber, caster, toe-in, kingpin inclination and turning radius of the vehicle wheels while the wheels are mounted on the vehicles.

It is a further object of the invention to provide an apparatus which is compact and easy to handle.

It is a further object of the invention to provide an apparatus which insures great accuracy in measuring.

It is still a further object of the invention to provide an apparatus which does not include a source of light for producing a light beam.

It is an additional object of the invention to provide auxiliary means for accurately adjusting the measuring apparatus before taking measurements so as to still further increase the accuracy of the measurements.

It is a still further object of the invention to provide an apparatus which may be used in daylight without lowering the accuracy.

With these objects in view, the invention consists of an apparatus for measuring the alignment relations of wheels of vehicles which comprises: a mirror fastened on said wheels and facing laterally therefrom, a telescope fitted with cross-threads, a reflector, a reading plate having at least one scale, said telescope, said reflector and said reading plate being arranged in such a manner that the reading plate may be observed when looking into the telescope.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a plan view of a first embodiment of the measuring apparatus according to the invention together with a pair of vehicle wheels, Fig. 2 is a front view of a wheel with a mirror attachment mounted thereon, Fig. 3 is a partial view of the measuring apparatus according to Fig. 1 as seen in the direction of arrow Q, Fig. 4 is a section on line 4—4 of Fig. 1 without the vehicle wheels, Fig. 5 is a diagrammatic view of the optical system, Fig. 6 is a plan view of a second embodiment of the measuring apparatus according to the invention, Fig. 7 is a view of the gauging unit with the deflecting element in lower position as seen in the direction of arrow S, Fig. 8 is a view of the gauging unit with the deflecting element in upper position as seen in the direction of arrow T, Fig. 9 is a perspective view of the deflecting element according to Figs. 6 to 8, Fig. 10 is a side view of the adjusting element, Fig. 11 is a front view of the adjusting element.

Referring now to Figs. 1 to 5, F is a wheel mirror attachment comprising a wheel mirror unit 512, said attachment being adapted to be fastened to the respective wheel. The support on which said wheel mirror is mounted comprises a cross rail 513 having at its ends two hooks 631 to be engaged with the edge of the wheel rim 611. Fastened, e.g. by welding, to said cross rail are two central rods 514 to the ends of which a guiding element 515 is secured. In this guiding element a radial link 516 is slidably arranged which engages the edge of the wheel rim 611 by means of its hook 661 and is biased by means of a compression spring 517 pressing with its one end against a disc 662 of the radial link 516 and with its other end against said guiding element 515. Rigidly secured to the central rods 514 is a supporting plate 519 connected to an adjustment plate 518 by means of three adjusting screws 520, with springs 540 arranged between the heads of said screws and said adjustment plate. Adjusting of the plate is achieved by nuts 541 threadedly engaged on said screws and forced against the inner surface of said adjustment plate 518 by the action of said springs 540. Fastened to the adjustment plate is a pin 542 on which the wheel mirror 512 is pivotally engaged in such a manner that the mirror may be rotated in a plane at right angles to the axis of the pin and remains in the respective position to which it has been adjusted. The mirror unit 512 is mounted in a frame 621 and consists of a central mirror 622 and two side mirrors 623 arranged at an angle of 20 degrees as compared to the central mirror. As said wheel mirror attachment forms no part of the invention it will no further be described.

The measuring apparatus comprises a mounting frame G and two gauging units H.

The mounting frame G consists of a tube 520 having a straight portion and two end portions 701 arranged at right angles to the straight portion, with legs 521 and 525 attached to the said straight and said bent-off portions respectively, with the result that the entire mounting frame may be placed on the ground. Attached to the bent-off portions 701 and their legs 525 respectively are two guiding elements 526 disposed vertically above each other and in a direction at right angles to the bent-off portions 701.

In these guiding elements the gauging units H are slidably disposed with their guide rods 527 and 528. A screw 529' arranged on the mounting frame serves to secure the units in place after adjustment. As may best be seen from Fig. 1, rods 527 and 528 are bent two times at right angles, the rods having thus a shape similar to a U, with two vertically disposed rails 530 connecting said rods rigidly together (see Fig. 3). Secured to the upper rod 527 is a telescope 531 having crossthreads arranged at right angles, the telescope being vertically disposed to the ground the mounting frame is placed upon.

Arranged below telescope 531 is a reflector 533 which is adjustably attached by means of three adjusting screws 529 to a support 537 fastened to rod 528.

As may best be seen from Fig. 4, a reading plate 534 is disposed below reflector 533, said plate having two scales 535 and 536, one being vertically and the other horizontally disposed.

On the other end of mounting frame G a second gauging unit H is arranged, which is a reverse duplicate of the one described, the parts of this unit H being denoted for simplicity sake with the same reference numbers as the unit just described.

Gauging of the wheels may be accomplished as follows:

After mounting the wheel mirror attachments to the rims 611 of a pair of wheels 511 in known manner, the wheels are slightly lifted. Now the image of the reading plate 534 may be observed in the telescope 531 of the gauging unit H with the image of the reading plate being reflected by the reflector 533 and the central mirror 622. The wheel is then rotated and the mirror 512 is set, by adjusting the three adjusting screws, in such a position that the image of the scales 535 and 536 remains stationary while the wheel is rotating. Now the mirror 512 is vertically arranged to the axis of the wheel. After setting the mirror in the manner described the wheels are lowered to the ground, whereupon the rotatably arranged mirror 512 is adjusted in such a manner that the upper and lower edges of the frame are horizontally disposed, which may be done by means of a water level in a manner well known. Now the distance between the surface of central mirror 622 and the reading plate 534 is adjusted to a certain predetermined distance, e.g. by means of a measuring rod of definite length, the adjusting being done by sliding the gauging unit H in the guiding elements, whereupon the gauging unit is secured in place by means of set screw 529. The distance between mirror 512 and plate is of such a length that one graduation of the scale corresponds to the wheel being adjusted by one full degree.

The two telescopes 531 are arranged in such a manner that their cross-threads are parallelly disposed to the scales of the respective reading plates 534. Either of the wheels 511 is now turned on its vertical axis until the vertical thread of the cross-threads of the respective telescope coincides with the vertical scale 535 of the respective reading plate 534. The toe-in of the wheels may then be measured by observing and reading the horizontal scale of the other reading plate 534 through the other telescope 531.

In a similar manner the caster of the wheels may be determined by means of the horizontal lines of the cross-threads and the vertical scales of the reading plates. After completing the measuring of the toe-in and caster in the manner described, for instance the left wheel 511 is turned about an angle towards the right or left until the respective side mirror 623 is in such a position that the vertical line of the cross-threads of the left telescope 531 coincides with the vertical scale 535 of the left reading plate 534. The horizontal line of the cross-threads of the right telescope 531 indicates a deflection on the right scale 536 as compared to the camber measurement which may be used to determine caster, inclination of the steering knuckle pivot and king-pin inclination from a special table.

When, after turning a wheel about 20 degrees, the vertical line of the inner gauging unit H coincides with the vertical scale 535, then the turning angle of the outer wheel may be determined by means of the outer gauging unit.

Checking the rear wheels may be done in a similar manner as described in connection with the front wheels.

Described in Figs. 6 to 11 is a device and a method for setting a measuring apparatus adapted to check the alignment characteristics of automobile wheels in such a manner that the crosswise disposed axis of the apparatus is at right angles to the central longitudinal plane of the vehicle.

In Fig. 6 a vehicle is denoted by A, the vehicle having a front axle 10, front wheels 11 and 12, a rear axle 13, rear wheels 14 and 15 and a connecting central tube 16.

The measuring apparatus B, C comprises a mounting frame B consisting of a U-shaped rod 17 and supporting plates 18 and 19, which are fitted with a V-shaped guiding rail 181 and 191 respectively and have slots 182 and 192 respectively. Fastened to rod 17 are three legs 20, 21 and 22 so that the mounting frame may be placed on the ground.

On each of the supporting plates 18 and 19 a gauging unit C is slidably arranged, with the rails 181 and 191 respectively fitting into corresponding grooves of frames 23 of the gauging units C. One of these gauging units C will now be described in more detail in connection with the Figs. 6, 7 and 8, the other unit being the reverse duplicate of the one described and bears the same denotations for the various parts.

The unit is secured to its supporting plate by means of a screw 24 which passes through slot 182 and may be screwed into a threaded hole of frame 23. On top of frame 23 a telescope 25 is provided and underneath of this telescope a reflector 26 is arranged, said reflector being angled at 45 degrees to the optical axis. To the plane surface 231 of frame 23 a reading plate 27 is fastened, said plate having two graduated scales arranged at right angles, one being vertically and the other horizontally disposed. Arranged on the surface 231 of frame 23 is also a deflecting element D, said element being swingably provided about a pivot 232 and being fitted with a holder 28 which is equipped with a reflector 29. The deflecting element D may be swung back and forth into an upper and a lower position with said positions being determined by stop members, Fig. 7 showing the element swung to its lower position and Fig. 8 to the upper position. In the latter position the holder 28 abuts the pin 41, and the reflector 29 is then with its surface parallel to the optical axis of the telescope and arranged at 45 degrees to the crosswise disposed optical axis of the measuring apparatus B, C.

Referring now to Figs. 6, 10 and 11 the adjusting unit E will now be described. This unit comprises a frame consisting of a U-shaped pipe 31 to which another pipe 32 is welded, said latter pipe representing the third leg of the frame. Fastened to the bottom ends of pipes 31 and 32 are discs 33 so that the frame may be securely placed on the ground. On the upper portion of pipe 31 a reading plate 34 is attached, said plate having a horizontal scale 341, with the graduation lines being vertically disposed. Pipes 31 have crosswise arranged holes, through which an adjusting rod 35 is placed, said rod having a double bend and bearing a feeler plate 36 at its one end. The adjusting rod 35 may be secured in place by means of an adjusting ring 37 fitted with a set screw 38. A spring forces ring 37 against the inside of the right leg according to Fig. 11 of the U-shaped pipe. At the bottom side of reading plate 34 a stop bracket 40 is fastened, said bracket serving to properly place the adjusting element E with respect to the gauging unit C.

In the following the adjustment of the measuring apparatus B, C will now be described.

The vehicle A is placed on level ground in such a manner that the wheels are symmetrical relative to the central longitudinal plane of the vehicle. After checking the measuring apparatus B, C with respect to its own crosswise disposed optical axis, which must coincide for both gauging units C, the measuring apparatus is arranged by sight in such a manner that the crosswise disposed optical axis of the apparatus is approximately at right angles to the central longitudinal plane of the vehicle. The latter is shown by dot-dash lines in Fig. 6 and denoted by $m$, while the optical axis of the apparatus is also shown in dot-dash lines and is denoted by $n$.

Now, when deflecting element D is in its upper position the line of sight extends along the optical axis of the telescope 25 to the reflectors 26 and 29 and is thus deflected by the reflector 26 into a direction $n$ which is at right angles to the optical axis of the telescope and by the reflector 27 into direction $p$ which is at right angles to the direction $n$.

The adjusting element E is then moved so close to the gauging unit with the plane of the reading plate 34 disposed at right angles to the central plane $m$ that stop bracket 40 arranged on the lower portion of the reading plate 34 abuts a predetermined abutment edge of gauging unit C, e.g. the sidewise arranged edge of reading plate 27, as this is indicated by the dot-dash line position of Fig. 6. Now the zero line of scale 341 on the reading plate 34 of the adjusting element E lies in the vertical plane through line $p$. The adjusting rod 35 is set at such a length that it abuts with its feeler plate 36 a certain part of the vehicle, preferably the lower central rim portion of the respective front wheel, and is then secured in this position by means of adjusting ring 37 and set screw 38.

The adjusting element E is then moved to the corresponding rear wheel and placed in such a manner that the feeler plate 36 of the adjusting rod 35 abuts the same rim portion of the rear wheel with the surface of the reading plate 34 still disposed vertically to the direction of beam $p$.

The same adjustment is carried out on the other side with a second adjusting unit E.

In order to properly set the measuring apparatus B, C, the latter is moved, e.g. by swinging the apparatus about legs 20, 21 or 22, until by means of the cross-threads of the two telescopes 25 the same graduation on both scales 341 of the two adjusting units E is observed. When this is the case, the optical crosswise disposed axis of the measuring apparatus will be at right angles to the central longitudinal plane $m$ of the vehicle.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Measuring apparatus for measuring the alignment of wheels of vehicles, comprising, in combination, support means having two opposite sighting points and adapted to be placed in the vicinity of a vehicle so that opposite wheels on the same axle of the vehicle are opposite said sighting points of said support means, respectively; mirror means mounted on said wheels opposite said sighting points; measuring indicia on said support means opposite said mirror means; and two sighting means mounted on said support means at said sighting points thereof, respectively, for sighting the image of said measuring indicia when the same is reflected by said mirror means mounted on the wheel of the vehicle opposite each respective sighting point whereby the position of the wheel opposite each sighting point of said support means relative to each sighting means, respectively, may be measured so that the position of the wheels relative to each other may be determined.

2. Measuring apparatus for measuring the alignment of wheels of vehicles, comprising, in combination, support means having two opposite sighting points and adapted to be placed in the vicinity of a vehicle so that opposite wheels on the same axle of the vehicle are opposite said sighting points of said support means, respectively; mirror means mounted on said wheels opposite said sighting points; measuring indicia on said support means opposite said mirror means; and two sighting means mounted on said support means at said sighting points thereof, respectively, for sighting the position of said support means relative to the vehicle, whereby the position of said support means relative to the vehicle may be measured and determined, and also for sighting the image of said measuring indicia when the same is reflected by said mirror means mounted on the wheel of the vehicle opposite each respective sighting point, whereby the position of the wheel opposite each sighting point of said support means relative to each sighting means, respectively, may be measured so that the position of the wheels relative to the vehicle and each other may be determined when said support means occupies a known position relative to the vehicle.

3. Measuring apparatus for measuring the alignment of wheels of vehicles, comprising, in combination, support means having two opposite sighting points and adapted to be placed in the vicinity of a vehicle so that opposite wheels on the same axle of the vehicle are opposite said sighting points of said support means, respectively; mirror means mounted on said wheels opposite said sighting points; measuring indicia on said support means opposite said mirror means; and two sighting means mounted on said support means at said sighting points thereof, respectively, for sighting the position of said support means relative to the vehicle, whereby the position of said support means relative to the vehicle may be measured and determined so that said support means may be placed in a position relative to the vehicle wherein a line passing through said sighting points of said support means is normal to the longitudinal axis of the vehicle, and also for sighting the image of said measuring indicia when the same is reflected by said mirror means mounted on the wheel of the vehicle opposite each respective sighting point, whereby the position of the wheel opposite each sighting point of said support means relative to each sighting means, respectively, may be measured so that the position of the wheels relative to the vehicle and each other may be determined when said support means occupies a position relative to the vehicle wherein a line passing through said sighting points of said support means is normal to the longitudinal axis of the vehicle.

4. Measuring apparatus for measuring the alignment of wheels of vehicles, comprising, in combination, support means having two opposite sighting points and adapted to be placed in the vicinity of a vehicle so that opposite wheels on the same axle of the vehicle are opposite said sighting points of said support means, respectively; and two sighting devices mounted on said support means at said sighting points thereof, respectively, each of said sighting devices including a body portion, a measuring indicia on said body portion, and telescopic means having sighting marks and mounted on said body portion for sighting the image of said measuring indicia when the same is reflected by a mirror mounted on the wheel of the vehicle opposite each respective sighting point whereby the position of the wheel opposite each sighting point of said support means relative to each sighting device, respectively, may be measured so that the position of the wheels relative to each other may be determined.

5. Measuring apparatus for measuring the alignment of wheels of vehicles, comprising, in combination, support means having two opposite sighting points and adapted to be placed in the vicinity of a vehicle so that opposite wheels on the same axle of the vehicle are opposite said sighting points of said support means, respectively; and two sighting devices mounted on said support means at said sighting points thereof, respectively, each of said sighting devices including a body portion, a measuring indicia on said body portion, and telescopic means having sighting marks and mounted on said body portion for sighting the position of said support means relative to the vehicle whereby the position of said support means relative to the vehicle may be measured and determined so that said support means may be placed in a position relative to the vehicle wherein a line passing through said sighting points of said support means is normal to the longitudinal axis of the vehicle and also for sighting the image of said measuring indicia when the same is reflected by a mirror mounted on the wheel of the vehicle opposite each respective sighting point whereby the position of the wheel opposite each sighting point of said support means relative to each sighting device, respectively, may be measured so that the position of the wheels relative to the vehicle and each other may be determined when said support means occupies a position relative to the vehicle wherein a vertical plane passing through said sighting points of said support means is normal to the longitudinal axis of the vehicle.

6. Measuring apparatus for measuring the alignment of wheels of vehicles, comprising, in combination, support means having two opposite sighting points and adapted to be placed in the vicinity of a vehicle so that opposite wheels on the same axle of the vehicle are opposite said sighting points of said support means, respectively; mirror means mounted on said wheels opposite said sighting points; measuring indicia on said support means opposite said mirror means; two positioning units adapted to be placed, respectively, in the vicinity of the vehicle adjacent corresponding points on either side of the longitudinal axis of the vehicle and spaced from said axle; and two sighting means mounted on said support means at said sighting points thereof, respectively, for sighting the positioning unit on the same side of the longitudinal axis of the vehicle as each respective sighting means, whereby the position of said support means relative to the longitudinal axis of the vehicle may be measured and determined, and also for sighting the image of said measuring indicia when the same is reflected by said mirror means mounted on the wheel of the vehicle opposite each respective sighting point whereby the position of the wheel opposite each sighting point of said support means relative to each sighting means, respectively, may be measured so that the position of the wheels relative to the vehicle and to each other may be determined when said support means occupies a known position relative to the longitudinal axis of the vehicle.

7. Measuring apparatus for measuring the alignment of wheels of a vehicle, comprising, in combination, support means having two opposite sighting points and adapted to be placed in the vicinity of a vehicle so that opposite wheels on one axle of the vehicle are opposite said sighting points of said support means respectively; mirror means mounted on said wheels opposite said sighting points; measuring indicia on said support means opposite said mirror means; two positioning units adapted to be placed, respectively, in the vicinity of the vehicle adjacent corresponding points of opposite wheels on another axle of the vehicle; and two sighting means mounted on said support means at said sighting points thereof, respectively, for sighting the positioning unit on the same side of the vehicle as each respective sighting means, whereby the position of said support means relative to the vehicle may be measured and determined so that said support means may be placed in a position relative to the vehicle wherein a line passing through said sighting points of said support means is normal to the longitudinal axis of the vehicle and also for sighting the image of said measuring means indicia when the same is reflected by said mirror means mounted on the wheel of the vehicle opposite each respective sighting point whereby the position of the wheel opposite each sighting point of said support means relative to each sighting means, respectively, may be measured so that the position of the wheels of the one axle relative to the vehicle and to each other may be determined when said support means occupies a position relative to the vehicle wherein a vertical plane passing through said sighting points of said support means is normal to the longitudinal axis of the vehicle.

8. Measuring apparatus for measuring the alignment of wheels of a vehicle, comprising, in combination, support means having two opposite sighting points and adapted to be placed in the vicinity of a vehicle so that opposite wheels on one axle of the vehicle are opposite said sighting points of said support means, respectively; mirror means mounted on said wheels opposite said sighting points; measuring indicia on said support means opposite said mirror means; two positioning units adapted to be placed, respectively, in the vicinity of the vehicle adjacent corresponding points of opposite wheels on another axle of the vehicle, each of said positioning units including a support frame, a measuring indicia including a horizontally arranged measuring scale on said support frame, and feeler means on said support frame for engaging one of said points of one of the opposite wheels on said other axle of the vehicle whereby said measuring scale of each positioning unit may be placed a predetermined distance from said last-mentioned points, respectively; and two sighting means mounted on said support means at said sighting points thereof, respectively, for sighting said measuring scale of the positioning unit on the same side of the vehicle as each respective sighting means, whereby the position of said support means relative to the vehicle may be measured and determined so that said support means may be placed in a position relative to the vehicle wherein a line passing through said sighting points of said support means is normal to the longitudinal axis of the vehicle, and also for sighting the image of said measuring indicia when the same is reflected by said mirror means mounted on the wheel of the vehicle opposite each respective sighting point whereby the position of the wheel opposite each sighting point of said support means relative to each sighting means, respectively, may be measured so that the position of the wheels of the one axle relative to the vehicle and to each other may be determined when said support means occupies a position relative to the vehicle wherein a vertical plane passing through said sighting points of said support means is normal to the longitudinal axis of the vehicle.

9. Measuring apparatus for measuring the alignment of wheels of a vehicle, comprising, in combination, support means having two opposite sighting points and adapted to be placed in the vicinity of a vehicle so that opposite wheels on one axle of the vehicle are opposite said sighting points of said support means, respectively; mirror means mounted on said wheels opposite said sighting points; measuring indicia on said support means opposite said mirror means; two positioning units adapted to be placed, respectively, in the vicinity of the vehicle adjacent corresponding points of opposite wheels on another axle of the vehicle, each of said positioning units including a support frame, a measuring indicia including a horizontally arranged measuring scale having an index point, and feeler means on said support frame and having an engaging portion for engaging one of said points of one of the opposite wheels on said other axle of the vehicle, said feeler means being movable relative to said support frame whereby the distance between said engaging portion of said feeler means and said measuring scale may be varied so that said measuring scale of each respective positioning unit may be placed a predetermined distance from said last-mentioned point; and two sighting means mounted on said support means at said sighting points thereof, respectively, for sighting said measuring scale of the positioning unit on the same side of the vehicle as each respective sighting means, whereby the position of said support means relative to the vehicle may be measured and determined so that said support means may be placed in a position relative to the vehicle wherein a line passing through said sighting points of said support means is normal to the longitudinal axis of the vehicle, and also for sighting the image of said measuring indicia when the same is reflected by said mirror means mounted on the wheel of the vehicle opposite each respective sighting point, whereby the position of the wheel opposite each sighting point of said support means relative to each sighting means, respectively, may be measured so that the position of the wheels of the one axle relative to the vehicle and to each other may be determined when said support means occupies a position relative to the vehicle wherein a vertical plane passing through said sighting points of said support means is normal to the longitudinal axis of the vehicle.

10. Measuring apparatus as defined in claim 9 and coordinated aligning means on said sighting means and said positioning units for aligning said sighting means and said positioning units on the same side of the vehicle when each respective positioning unit is placed adjacent each respective sighting means so that each respective sighting means is sighted on said index point of each respective positioning unit whereby the position of each respective feeler means relative to each respective positioning unit may be adjusted by moving said engaging portion of said feeler means of each respective positioning unit into engagement with a point on the wheel of said one axle of the vehicle and opposite said respective sighting point which corresponds to said corresponding points of the wheels of said other axle of the vehicle.

11. Measuring apparatus for measuring the alignment of wheels of vehicles, comprising, in combination, support means having two opposite sighting points and adapted to be placed in the vicinity of a vehicle so that opposite wheels on the same axle of the vehicle are opposite said sighting points of said support means, respectively; two positioning units adapted to be placed, respectively, in the vicinity of the vehicle adjacent corresponding points on either side of the longitudinal axis of the vehicle and spaced from said axle; and two sighting devices mounted on said support means at said sighting points thereof, respectively, each of said sighting devices including a body portion, a measuring indicia on said body portion, a reflector member mounted on said body portion for movement between a reflecting position and a non-reflecting position, and telescopic means having sighting marks and mounted on said body portion for sighting the positioning unit on the same side of the longitudinal axis of the vehicle as each respective sighting device when said reflector member is in one of its positions whereby the position of said support means relative to the longitudinal axis of the vehicle may be measured and determined and also for sighting the image of said measuring indicia when the same is reflected by a mirror mounted on the wheel of the vehicle opposite each respective sighting point and when said reflector member is in the other of its positions whereby the position of the wheel opposite each sighting point of said support means relative to each sighting device, respectively, may be measured so that the position of the wheels relative to the vehicle and to each other may be determined when said support means occupies a known position relative to the longitudinal axis of the vehicle.

12. Measuring apparatus for measuring the alignment of wheels of vehicles, comprising, in combination, support means having two opposite sighting points and adapted to be placed in the vicinity of a vehicle so that opposite wheels on the same axle of the vehicle are opposite said sighting points of said support means, respectively; two positioning units adapted to be placed, respectively, in the vicinity of the vehicle adjacent corresponding points on either side of the longitudinal axis of the vehicle and spaced from said axle; and two sighting devices mounted on said support means at said sighting points thereof, respectively, each of said sighting devices including a body portion, a measuring indicia on said body portion, a stationary reflector member on said body portion, a movable reflector member mounted on said body portion for movement between a reflecting position and a non-reflecting position, and telescopic means having a substantially vertical optical axis and sighting marks and mounted on said body portion for sighting in a plane normal to a vertical plane passing through said sighting points of said support means the positioning unit on the same side of the longitudinal axis of the vehicle as each respective sighting device when said movable reflector member is in its reflecting position whereby the position of said support means relative to the longitudinal axis of the vehicle may be measured and determined and also for sighting in said vertical plane passing through said sighting points of said support means the image of said measuring indicia when the same is reflected by a mirror mounted on the wheel of the vehicle opposite each respective sighting point and by said stationary reflector member and when said movable reflector member is in its non-reflecting position whereby the position of the wheel opposite each sighting point of said support means relative to each sighting device, respectively, may be measured so that the position of the wheels relative to the vehicle and to each other may be determined when said support means occupies a known position relative to the longitudinal axis of the vehicle.

13. Measuring apparatus for measuring the alignment of wheels of vehicles, comprising, in combination, support means having two opposite sighting points and adapted to be placed in the vicinity of a vehicle so that opposite wheels on the same axle of the vehicle are opposite said sighting points of said support means, respectively; two positioning units adapted to be placed, respectively, in the vicinity of the vehicle adjacent corresponding points on either side of the longitudinal axis of the vehicle and spaced from said axle; and two sighting devices mounted on said support means at said sighting points thereof, respectively, each of said sighting devices including a body portion, a measuring indicia on said body portion, a stationary reflector member on said body portion, a movable reflector member mounted on said body portion for movement between a reflecting position and a non-reflecting position, said movable reflector member including a reflector element lying in a vertical plane forming an angle of 45° with a vertical plane passing through said sighting points of said support means when said movable reflector member is in its reflecting position, and telescopic means having a substantially vertical optical axis and sighting marks and mounted on said body portion for sighting in a plane normal to said vertical plane passing through said sighting points of said support means the positioning unit on the same side of the longitudinal axis of the vehicle as each respective sighting device when said movable reflector member is in its reflecting position whereby the position of said support means relative to the longitudinal axis of the vehicle may be measured and determined and also for sighting in said vertical plane passing through said sighting points of said support means the image of said measuring indicia when the same is reflected by a mirror mounted on the wheel of the vehicle opposite each respective sighting point and by said stationary reflector member and when said movable reflector member is in its non-reflecting position whereby the position of the wheel opposite each sighting point of said support means relative to each sighting device, respectively, may be measured so that the position of the wheel relative to the vehicle and to each other may be determined when said support means occupies a known position relative to the longitudinal axis of the vehicle.

14. Measuring apparatus for measuring the alignment of wheels of vehicles, comprising, in combination, support means having two opposite sighting points and adapted to be placed in the vicinity of a vehicle so that opposite wheels on the same axle of the vehicle are opposite said sighting points of said support means, respectively; two positioning units adapted to be placed, respectively, in the vicinity of the vehicle adjacent corresponding points of opposite wheels on another axle of the vehicle, each of said positioning units including a support frame, a measuring indicia on said support frame, and feeler means on said support frame for engaging one of said points of one of the opposite wheels on said other axle of the vehicle whereby said measuring indicia of each positioning unit may be placed a predetermined distance from said last-mentioned point, respectively; and two sighting devices mounted on said support means at said sighting points thereof, respectively, each of said sighting devices including a body portion, a measuring indicia on said body portion, a stationary reflector member on said body portion, a movable reflector member mounted on said body portion for movement between a reflecting position and a non-reflecting position, said movable reflector member including a reflector element lying in a vertical plane forming an angle of 45° with a vertical plane passing through said sighting points of support means when said movable reflector member is in its reflecting position, and telescopic means having a substantially vertical optical axis and sighting marks and mounted on said body portion for sighting in a plane normal to said vertical plane passing through said sighting points of said support means the image of said measuring indicia of the positioning unit on the same side of the longitudinal axis of the vehicle as each respective sighting device when the image is reflected by said reflector element of said movable reflector member when the same is in its reflecting position and by said stationary reflector member whereby the position of said support means relative to the longitudinal axis of the vehicle may be measured and determined and also for sighting in said vertical plane passing through said sighting points of said support means the image of said measuring indicia of each respective sighting device when the same is reflected by a mirror mounted on the wheel of the vehicle opposite each respective sighting point and by said stationary reflector member and when said movable reflector member is in its non-reflecting position whereby the position of the wheel opposite each sighting point of said support means relative to each sighting device, respectively, may be measured so that the position of the wheel relative to the vehicle and to each other may be determined when said support means occupies a known position relative to the longitudinal axis of the vehicle.

References Cited in the file of this patent
UNITED STATES PATENTS

| | | |
|---|---|---|
| 2,038,914 | Templeton | Apr. 28, 1936 |
| 2,213,605 | Mathieu | Sept. 3, 1940 |
| 2,410,339 | Creagmile | Oct. 29, 1946 |
| 2,496,324 | Wilson | Feb. 7, 1950 |
| 2,564,510 | Shoemaker | Aug. 14, 1951 |
| 2,601,262 | Carrigan | June 24, 1952 |
| 2,755,554 | MacMillan | July 24, 1956 |